(12) United States Patent
Frantz et al.

(10) Patent No.: US 6,640,687 B1
(45) Date of Patent: Nov. 4, 2003

(54) CONTROL SYSTEM FOR HYDROSTATIC PUMP

(75) Inventors: Stephen C. Frantz, Lawrence, KS (US); Shannon D. Carver, Nevada, IA (US); Craig C. Klocke, Ames, IA (US); Dennis M. Greene, Ames, IA (US)

(73) Assignee: Sauer-Danfoss Inc., Ames, IA (US)

( * ) Notice: Subject to any disclaimer, the term of this patent is extended or adjusted under 35 U.S.C. 154(b) by 0 days.

(21) Appl. No.: 10/215,807

(22) Filed: Aug. 9, 2002

(51) Int. Cl.$^7$ .............................................. F01B 13/04
(52) U.S. Cl. ...................... 91/504; 91/505; 417/222.1; 417/53
(58) Field of Search .................. 91/504, 505, 506; 417/222.1, 53

(56) References Cited

U.S. PATENT DOCUMENTS

| | | | | | |
|---|---|---|---|---|---|
| 3,282,225 | A | * | 11/1966 | Moon, Jr. ..................... | 60/452 |
| 3,319,419 | A | * | 5/1967 | Hann ........................... | 60/449 |
| 3,463,087 | A | * | 8/1969 | Grant ........................... | 91/506 |
| 5,285,641 | A | * | 2/1994 | Goto et al. .................... | 60/422 |
| 5,564,905 | A | * | 10/1996 | Manring .................. | 417/222.1 |

* cited by examiner

Primary Examiner—Charles G. Freay

(57) ABSTRACT

A non-feedback proportional system is provided to achieve desired operating characteristics which will allow the control of a hydrostatic transmission to closely approximate the control performance of a displacement feedback control system by establishing certain parameters relating to (1) the servo spring rate; (2) the valve plate index; (3) valve plate crossport/trap; (4) valve plate porting geometry; (5) swashplate offset; and (6) piston bore volume.

1 Claim, 11 Drawing Sheets

CONTROL SYSTEM FOR HYDROSTATIC PUMP

BACKGROUND OF THE INVENTION

Displacement feedback control systems (DFCs) and non-feedback proportional (NFPs) have previously been used for axial piston hydrostatic pumps. The Control Block Diagrams A and B shown in FIGS. 16 and 17 the basic differences between the Feedback (DFC) and non-feedback (NFP) control systems.

The control of the pump necessarily involves controlling the position of the swashplate of the pump. With a DFC mechanism, the swashplate position is primarily a function of only an input signal, manual, electrical or hydraulic. The DFC controls position of a servo piston and swashplate system proportional to the input signal utilizing a mechanical feedback linkage. With an NFP control, the swashplate position is a function of the input signal and the moments imposed on the swashplate which are dependent on the input speed to the pump, the operating pressure for the pump, and the swashplate angle.

The DFC system has several functional advantages, but is expensive to manufacture. The NFP is less expensive but also has certain beneficial characteristics including a softer ride for the vehicle driven by the transmission, and inherent characteristics similar to a low performance anti-stall system. However, on certain types of vehicles, these characteristics can be drawbacks. This is especially true of vehicles requiring constant speed (i.e., constant swashplate position), aggressive performance, responsiveness independent of vehicle load, and applications which use a micro-processor based anti-stall system sensing engine speed. In addition, the NFP control is typically less stable than a DFC due to the lack of compensation provided by the feedback mechanism.

Therefore, it is a principal object of this invention to provide a NFP system to allow improved control for a hydrostatic pump.

More specifically, it is an object of this invention to provide a NFP system to achieve desired operating characteristics which will allow the control of a hydrostatic transmission to closely approximate the control performance provided of a DFC system.

These and other objects will be apparent to those skilled in the art.

SUMMARY OF THE INVENTION

A method is provided for allowing a hydraulic pump with a non-feedback proportional control to closely approximate the performance of a displacement feedback control by taking a hydraulic pump including a rotatable piston group engaging a pivotal swashplate, with the pump having associated therewith an input power shaft and a servo piston mechanically connected to the swashplate to influence a torque imposed on the swashplate when rotational power is imposed on the pump, and a neutral return spring connected to the swashplate and a pump housing; providing a valve plate to control fluid flow between pistons in the group and pressure and return fluid conduits; providing in the valve plate a plurality of elongated arcuate slots extending therethrough concentrically located at a constant radius with respect to a center of the plate and an axis of rotation of the piston group, with each slot having opposite ends, an elongated notch at one end of some of the slots and extending away from the end to form a bottom with sidewalls extending upwardly with respect to the bottom; providing a valve plate index for the valve plate to approximately a −1.5° to −0.5° wherein the valve plate index is defined as the location of a pressure transition zone relative to top or bottom dead center positions of a piston in the rotatable piston group being in either a fully retracted or fully extended position in its operational movement; providing a cylinder block with a piston port for the piston group with fluid inlet and outlet ports in communication with the pistons of the piston group; providing valve plate crossport of approximately 3° to 9° wherein the valve plate crossport is defined as the amount of angle of rotation during which the piston port in the cylinder block is connected to both the inlet and outlet ports at the same time; maintaining the swashplate at a first swashplate offset of −0.015 in. to +0.015 in. in a first direction parallel to axes of rotation of the piston group; maintaining the swashplate at a second swashplate offset of −0.060 in. to +0.060 in. in a second direction perpendicular to a longitudinal axis of the pistons; maintaining the ratio of the volumes of the fluid in the piston bores at a top dead center position of movement of the piston in the bore to the volume at a bottom dead center position of 0.53 to 0.73 and adjusting the spring rate of the return spring to a range of approximately 470–670 pounds/inch; whereby the dependency of the angular position of the swashplate is influenced by less than 50% on operating conditions of the transmission and is increasingly influenced by more than 50% by an input signal acting thereon to ensure stability throughout the transmission's operating range for speed, pressure and swashplate angle.

DESCRIPTION OF THE PREFERRED EMBODIMENT

The overall goal of this invention is to control the slope and separation of control torque curves as a function of speed, system pressure, and swashplate angle. This includes: (1) reducing the dependency of the swashplate angle on non-input signal parameters (i.e., system pressure and speed); (2) increasing the dependency of the angle of the swashplate on the input signal; (3) ensuring the stability throughout the operating range of the vehicle for speed, pressure and swashplate angle; and (4) reducing the swashplate vibration and noise in conjunction with steps (1)–(3).

The foregoing goal is achieved by bringing together a plurality of known control concepts, fine tuning some or all of these concepts within certain parameters, as discussed hereafter, wherein a control system results which will allow the control of a hydrostatic transmission to approximate the control performance of a DFC system.

Figure 1:
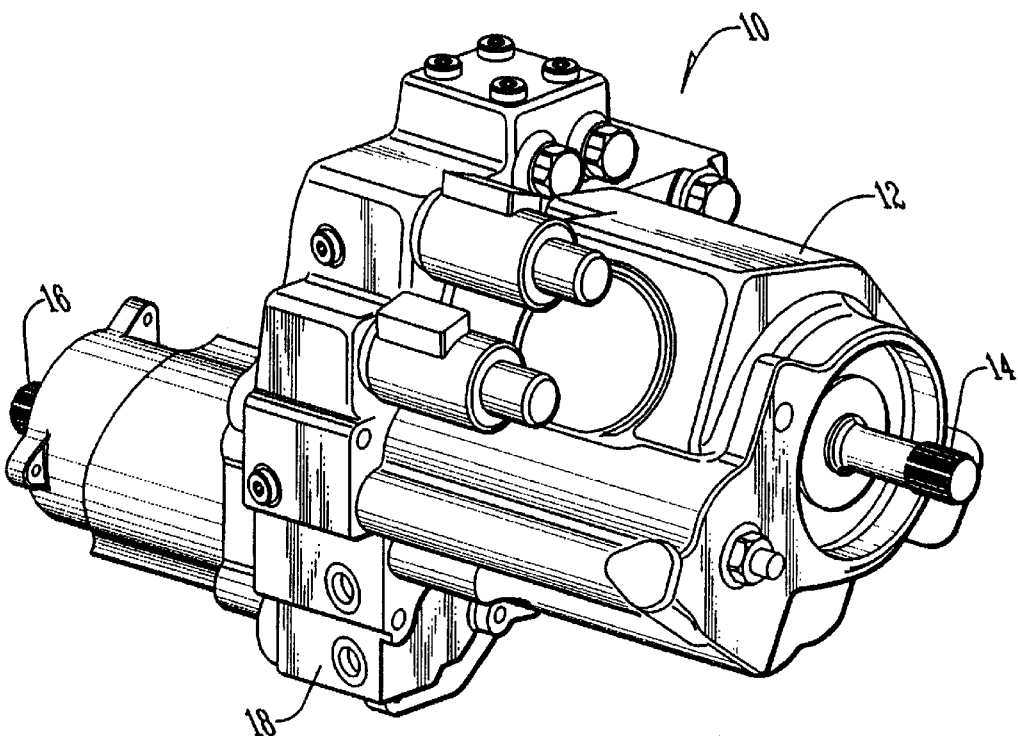
FIG. 1 is a perspective view of a hydrostatic transmission adaptable for use with this invention.
Figure 2:
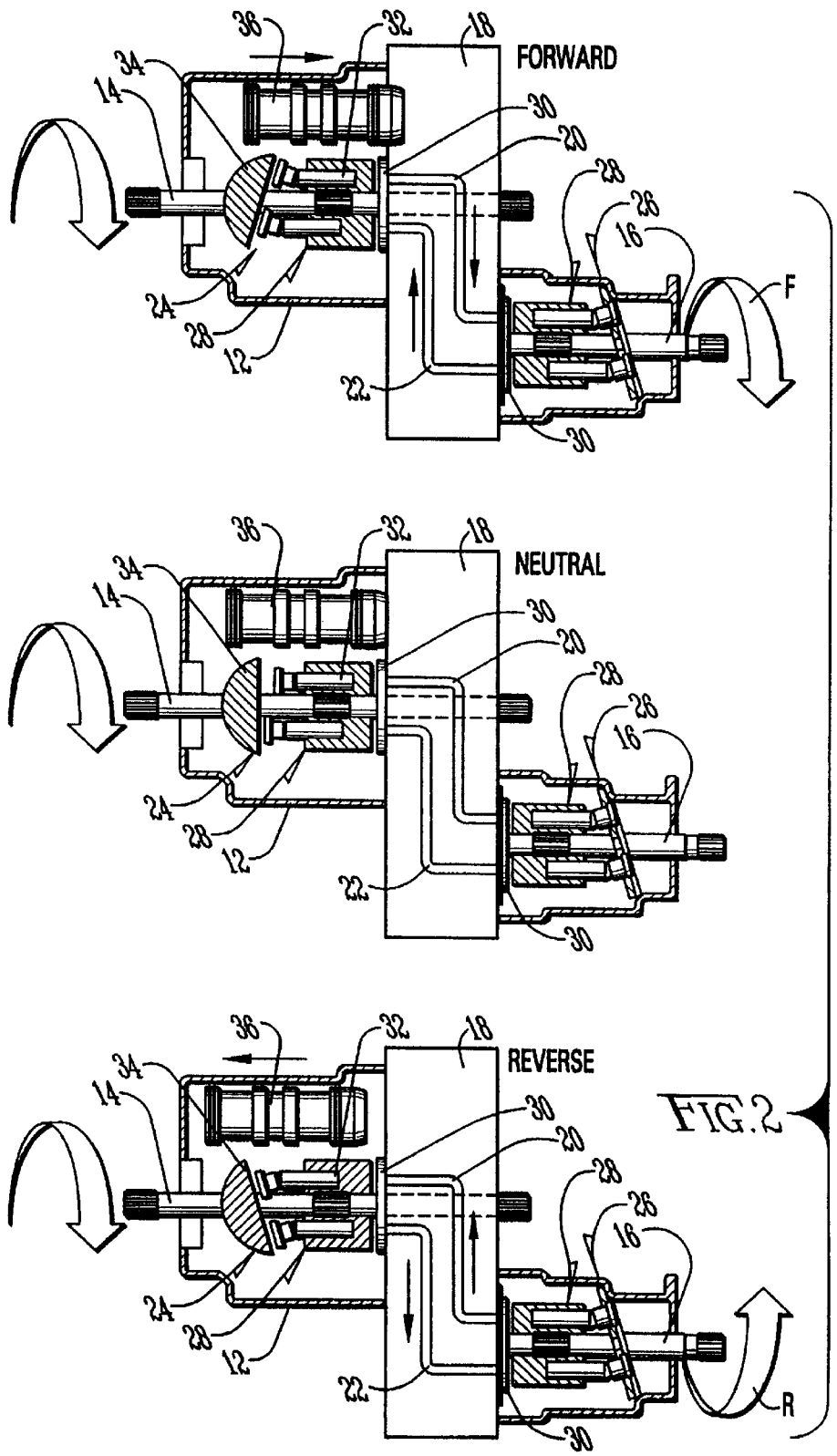
FIG. 2 is a schematic cross sectional view of the transmission of FIG. 1 in forward, neutral and reverse modes.

With reference to FIG. 1, a hydrostatic transmission 10 for use in a vehicle such as a compact utility tractor has a housing 12 having a Z-shaped configuration with an input shaft 14 parallel to but offset from an output shaft 16. As seen in FIG. 2, the housing 12 has a center section 18 with internal fluid conduits 20 and 22 which fluidly connect hydrostatic pump 24 with hydrostatic motor 26. Input shaft 14 is conventionally connected to pump 24, and output shaft 16 is operatively connected to motor 26.

The pump 24 has a conventional rotating group 28 mounted on a valve plate 30 and include a plurality of reciprocal pistons 32 with "outer" ends which conventionally engage the flat side of swashplate 34 which is pivotally mounted on a trunnion (not shown). Fluid from conduits 20 and 22 flow through conventional ports in the valve plate 30 to fluidly connect the pump 24 and the motor 26. The input shaft 14 freely extends through a conventional aperture (not shown) in the swashplate. The angle of the swashplate determines the mode of output shaft 16. In the neutral position, there is no fluid flow in conduits 20 and 22 between the pump 24 and motor 26. For positions other than neutral the rotation of output shaft 16 is shown by the arrows F and R in FIG. 2 reflecting forward and rearward directions of travel. The corresponding angular position of the swashplate corresponding to the arrows F and R are also shown in FIG. 2. The numeral 36 designates an input signal actuated servo piston which is conventionally connected to the swashplate 34. The movement of the piston in valve 36 is designated by the arrows in FIG. 2 for the forward and reverse directions of rotation of the output shaft 16. This invention deals essentially with the control of the position of swashplate 34.

The known control concepts referenced above are (1) the servo spring rate; (2) the valve plate index; (3) valve plate crossport/trap; (4) valve plate porting geometry; (5) swashplate offset; and (6) piston bore volume. Each of these concepts will be discussed below.

Servo Spring Rate

Figure 3:
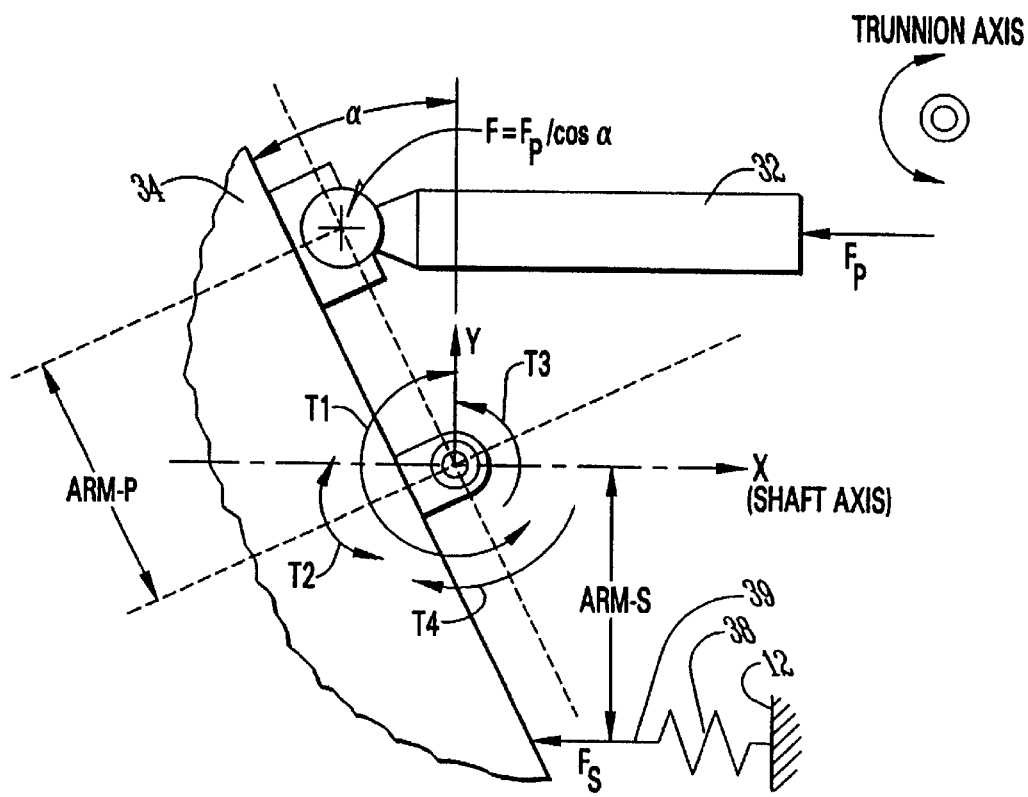
FIG. 3 is a schematic diagram showing the control forces acting on the swashplate.

FIG. 3 is a schematic drawing showing the control forces acting on the swashplate 34. The numeral 38 designates a servo spring which extends between the swashplate 34 and the housing 12. Every spring has a spring rate which is a measure of its physical makeup. In conjunction with this invention, the spring rate of servo spring 38 should be in the range of 470 to 670 pounds/inch.

The servo spring rate provides a differential load/torque to the swashplate 34 as the servo piston (not shown) of valve 36 and servo spring 38 are moved a given distance. The effect of piston bore pressure (discussed below) to average control torque required can be reduced, by increasing the spring rate so that pressure dependency is reduced. The spring rate overshadows differences due to pressure. The spring rate is also important for obtaining desired resolution of control torque between low and high swashplate angles.

Figure 4:
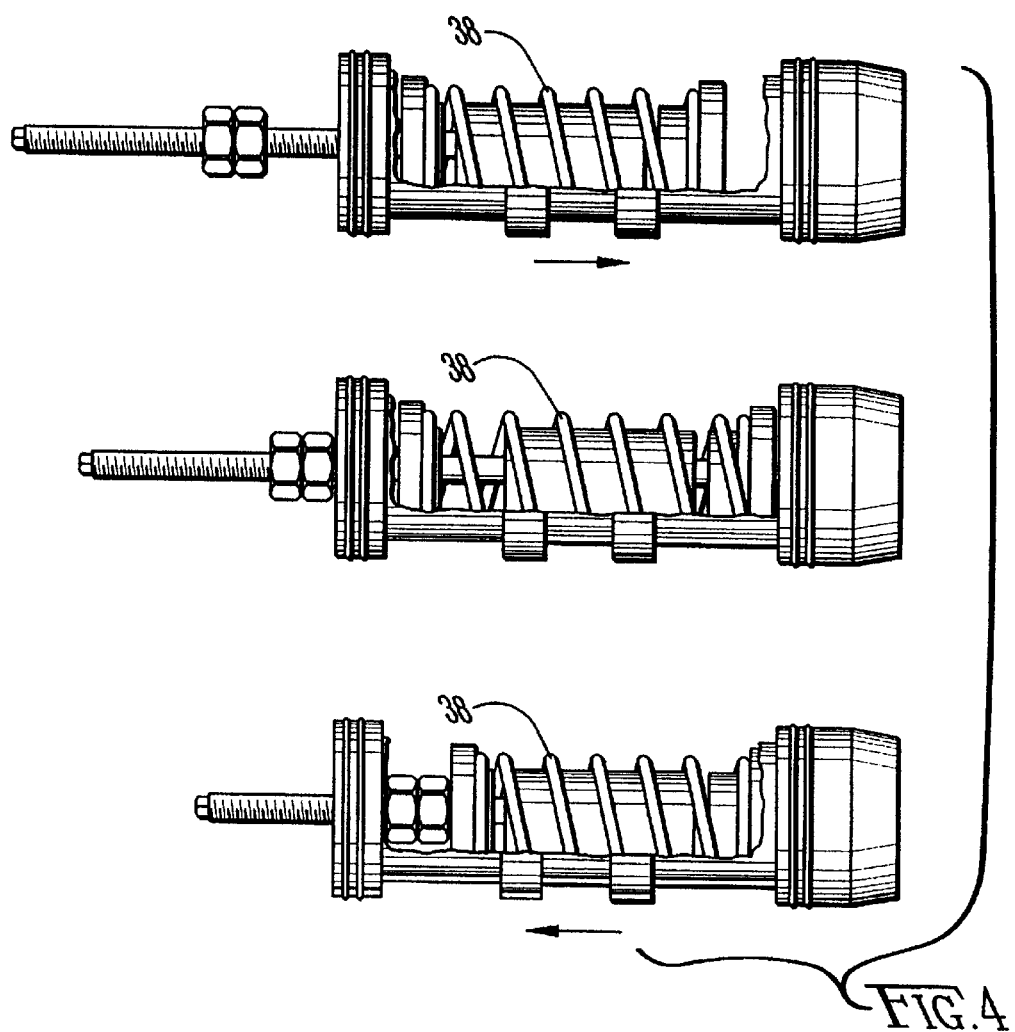
FIG. 4 is a schematic view of the progressive positions of the servo spring.
Figure 5:
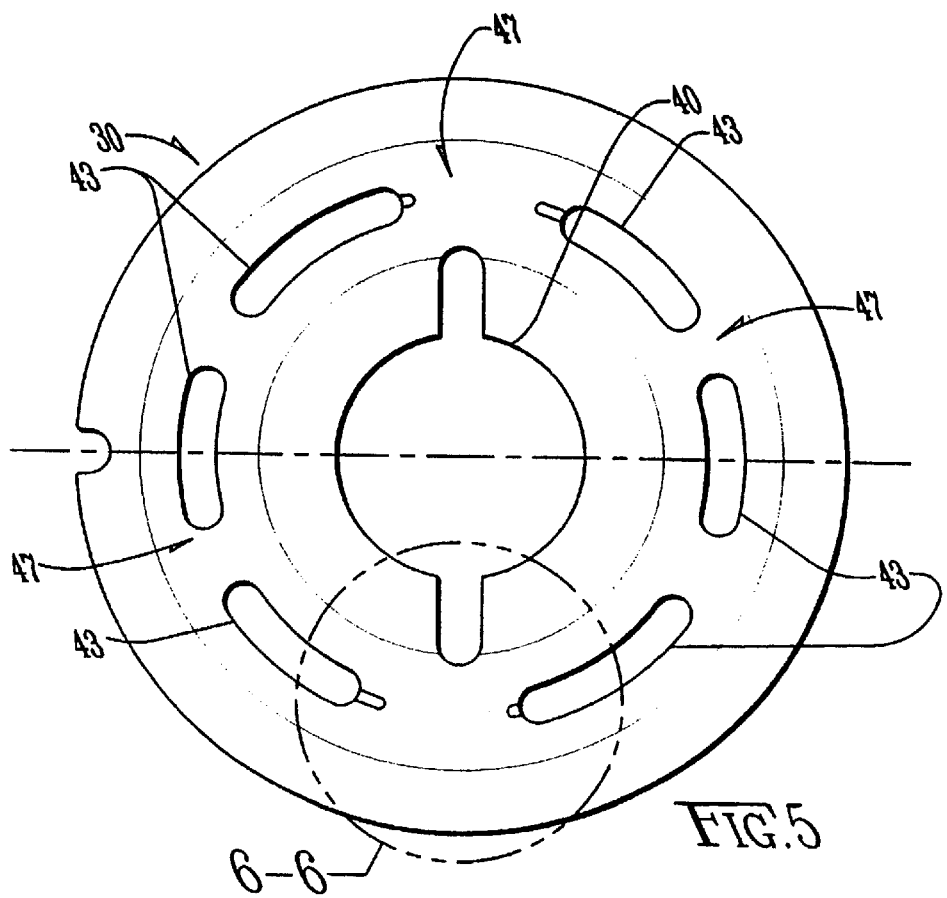
FIG. 5 is a plan view of the valve plate.
Figure 6:
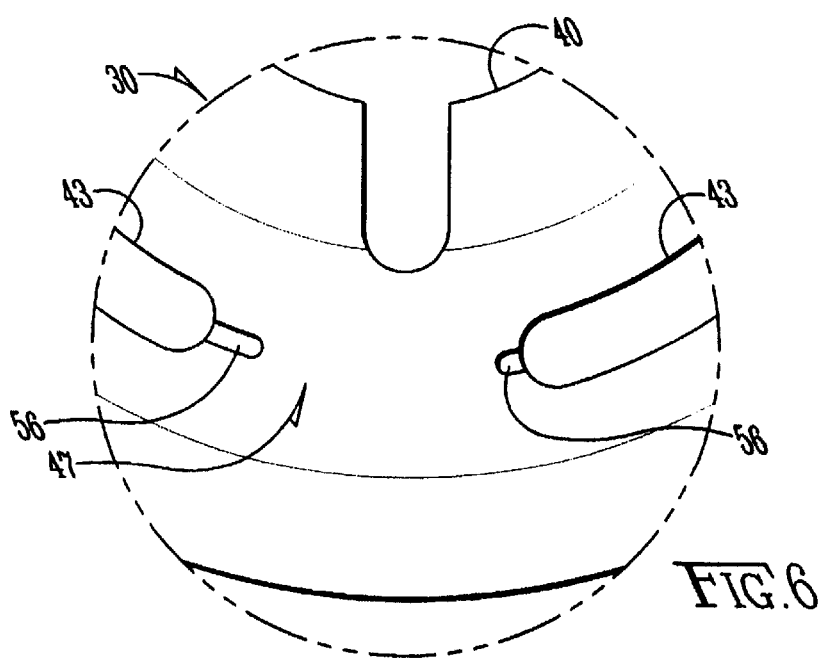
FIG. 6 is a partial plan view of the valve plate taken on line 6—6 of FIG. 5.

As shown in FIG. 3, spring 38 acts in the direction of the arrow 39. A more detailed view of spring 38 appears in FIG. 4. As indicated in FIG. 3, spring 38 acts on swashplate 34 to return it to the neutral position of FIG. 2. As such, the spring is a part of the input signals acting on the swashplate. With the other criteria set forth herein, it is important to maintain the spring rate of the spring 38 within the range recited above to achieve the optimum utility of the invention. The arrows T1–T4 in FIG. 3 designate the following:

T1 = Total Torque About Trunnion
T2 = Pressure Moment About Trunnion
T3 = Inertia Moment About Trunnion
T4 = Neutral Return Spring Moment About Trunnion Valve Plate The valve plate 30 is germane to the concepts of valve plate index, valve plate crossport/trap, and valve plate porting geometry. Each of these features are discussed below.

Valve Plate Index

As previously indicated, valve plates are located adjacent a center section and are in communication with center section conduits to receive or deliver fluid under pressure to the cylinder bores of reciprocating pistons located within the rotating group rotatably mounted on the side of the plate opposite to the center section.

Figure 7:
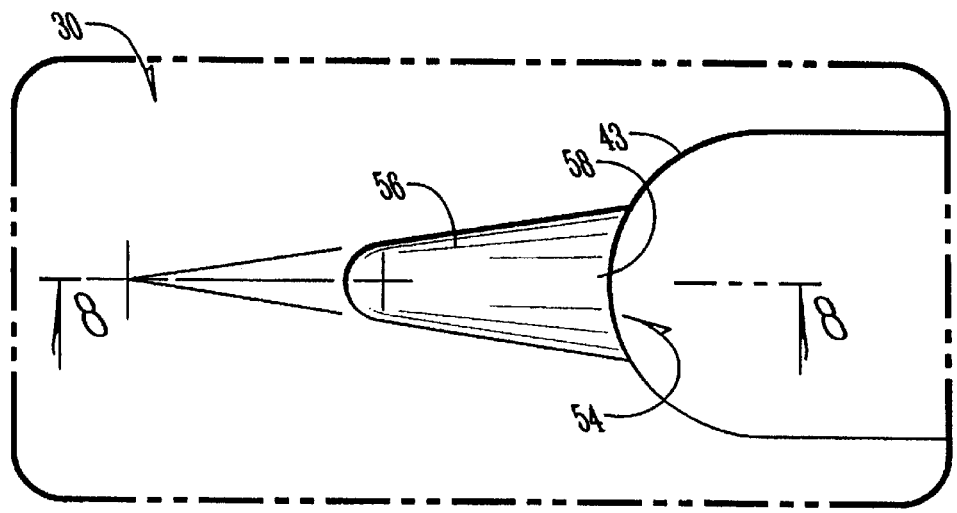
FIG. 7 is a partial plan view of the fluid inlet into one of the grooves in the valve plate.
Figure 8:
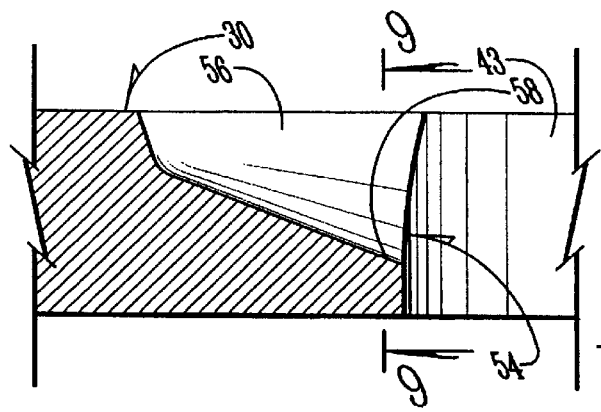
FIG. 8 is a sectional view taken on line 8—8 of FIG. 7.
Figure 9:
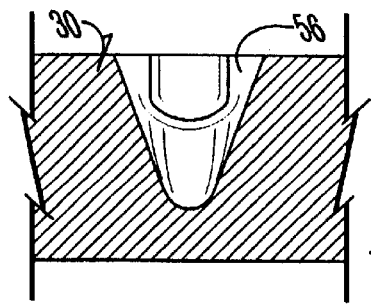
FIG. 9 is a sectional view taken on line 9—9 of FIG. 8.

The valve plate 30 is shown in FIGS. 5–10. It is circular in shape and has a center aperture 40 to permit the input shaft 14 to loosely extend therethrough in spaced condition to the aperture. A plurality of arcuate ports 43 appear in spaced relation on a circular axis that is concentrically located with respect to aperture 40. The ports are separated by lands 47. FIGS. 7, 8 and 9 show the details of the fluid inlet end 54 of ports 43. A tapered ramp 56 (FIGS. 7 and 8) having a V-shaped cross section (FIG. 9) is located adjacent certain of the ports 43. The lower ends 58 of the ramps 56 communicate with an end 54 of the ports 43 (FIG. 8) The ramp 56 increases in width as its elevation decreases towards the port 43 (FIG. 7). In lieu of a ramp, a rectangular notch having a bottom and sidewalls can be used. The ends of ports 43 opposite to end 54 has an outlet similar to end 54.

Figure 10:
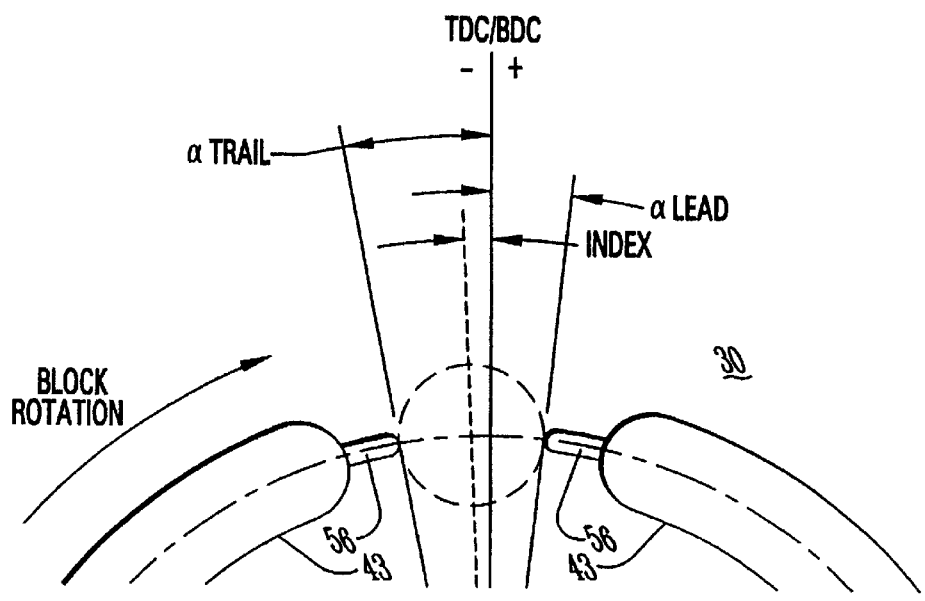
FIG. 10 is a diagram of valve plate indexing.

With reference to FIG. 10 the valve plate index controls the timing of precompression and decompression relative to TDC (top dead center) and BDC (bottom dead center) positions. Valve plate index is conventionally defined as:

$$\text{Index} = \frac{a_{Lead} - a_{Trial}}{2}$$

Valve plate index is the location of the pressure transition zone of a piston 32 in the rotating group 28 relative to the rotational position where the piston is either fully retracted (bottom dead center) or fully engaged (top dead center). Index is defined as positive in direction of cylinder block rotation. A positive index tends to increase neutral-seeking torque while a negative index tends to decrease neutral seeking-torque. Valve plate index affects the dependency of control torque relative to input speed. The valve plate index of this invention is preferably at about a negative 0.870°, and within the range of negative 1.5° to a negative 0.5°, because it relies additionally on crossport, porting geometry, and the X-offset (to be discussed hereafter) to contribute to stroke reducing torque.

Valve Plate Crossport/Trap

Figure 11:
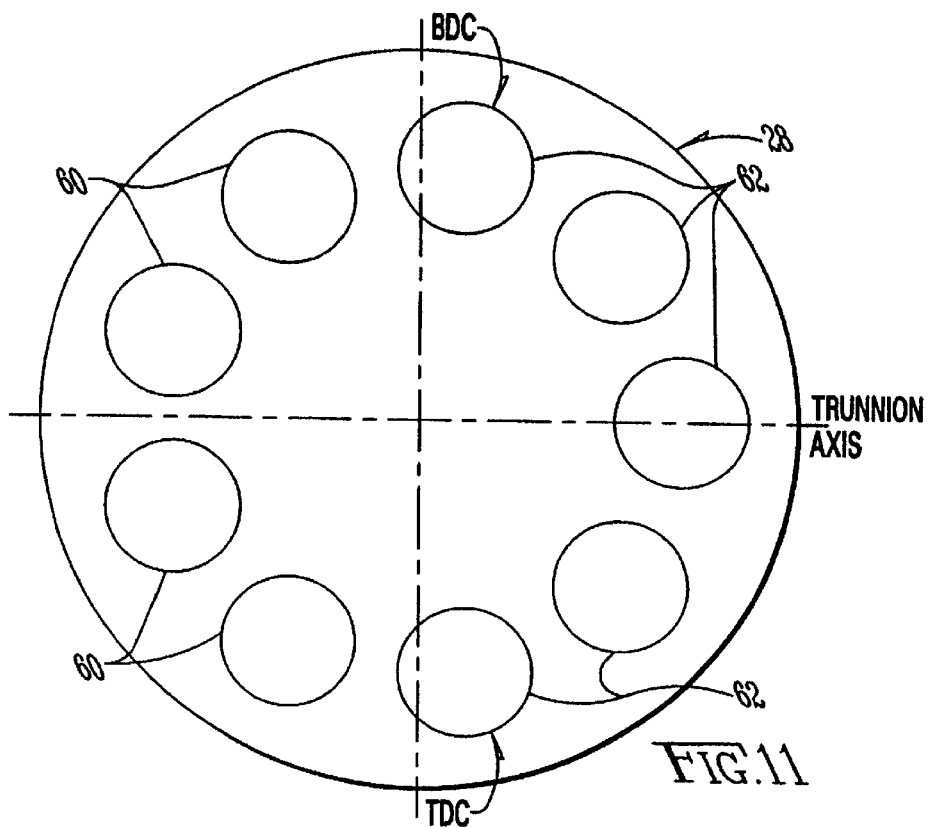
FIG. 11 is a bottom plan view showing the piston locations associated with inlet and outlet fluid pressures.
Figure 12:
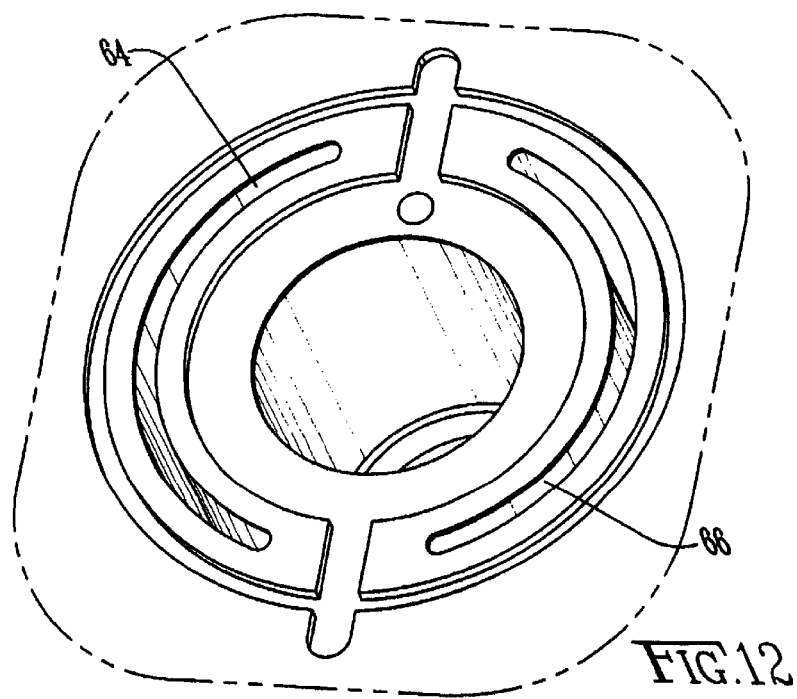
FIG. 12 is a perspective view of the bottom of the rotating group showing inlet and outlet ports.

Valve plate crossport is defined as the amount of angle of rotation during which the cylinder block piston ports 60 and 62 (FIG. 11) are connected to both the inlet and outlet ports 64 and 66 (FIG. 12) at the same time. Trap occurs when the cylinder block piston ports are blocked and are not connected to either the inlet or outlet ports 64 and 66.

Ports 60 and 62 (FIG. 11), ports 64 and 66 (FIG. 12); and ports 43 (FIG. 5) all register with each other at times during the operation of the invention.

Valve plate crossport/trap affects the dependency of control torque relative to input speed and system pressure and affects noise and vibration due to swashplate oscillation. Specifically, it affects the piston bore pressure rise rate which affects the average control torque. A 6° angle crossport works in conjunction with the porting geometry to provide a steeper bore pressure profile and reduce the effect of pressure on the average control torque. The angular range for crossport should be within the range of 3–9°.

Valve Plate Porting Geometry

This geometry was discussed above in relation to FIGS. 5–10 with regard to Valve Plate Index, and particularly in regard to FIGS. 7, 8 and 9.

Valve plate porting geometry affects the cross sectional area of inlet (FIG. 9) and outlet ports (64 and 66—FIG. 12) and the rise rate of piston bore pressure (discussed below) from the inlet port to the outlet port which has an effect on noise. Porting geometry interacts with valve plate index and crossport/trap to affect the dependency of control torque relative to system pressure, input speed, and swashplate angle. The goal of the porting geometry was to make the inlet area large. This increases the rise rate of the bore pressure profile and reduces the effect of pressure on the average control torque.

Swashplate Offset

Swashplate offset in an "X" direction (described below) is the distance between the trunnion rotation center and point of resolution of torque producing forces ("sweetspot"). See FIG. 13. Swashplate offset affects the control torque separation between low angle and high angle and is dependent on swashplate angle, system pressure, and speed. This offset should be in the range of –0.015 to 0.015 inches.

Offset in a "Y" direction (described below) should be in the range –0.060 to +0.060 inches. (FIG. 13).

Figure 13:
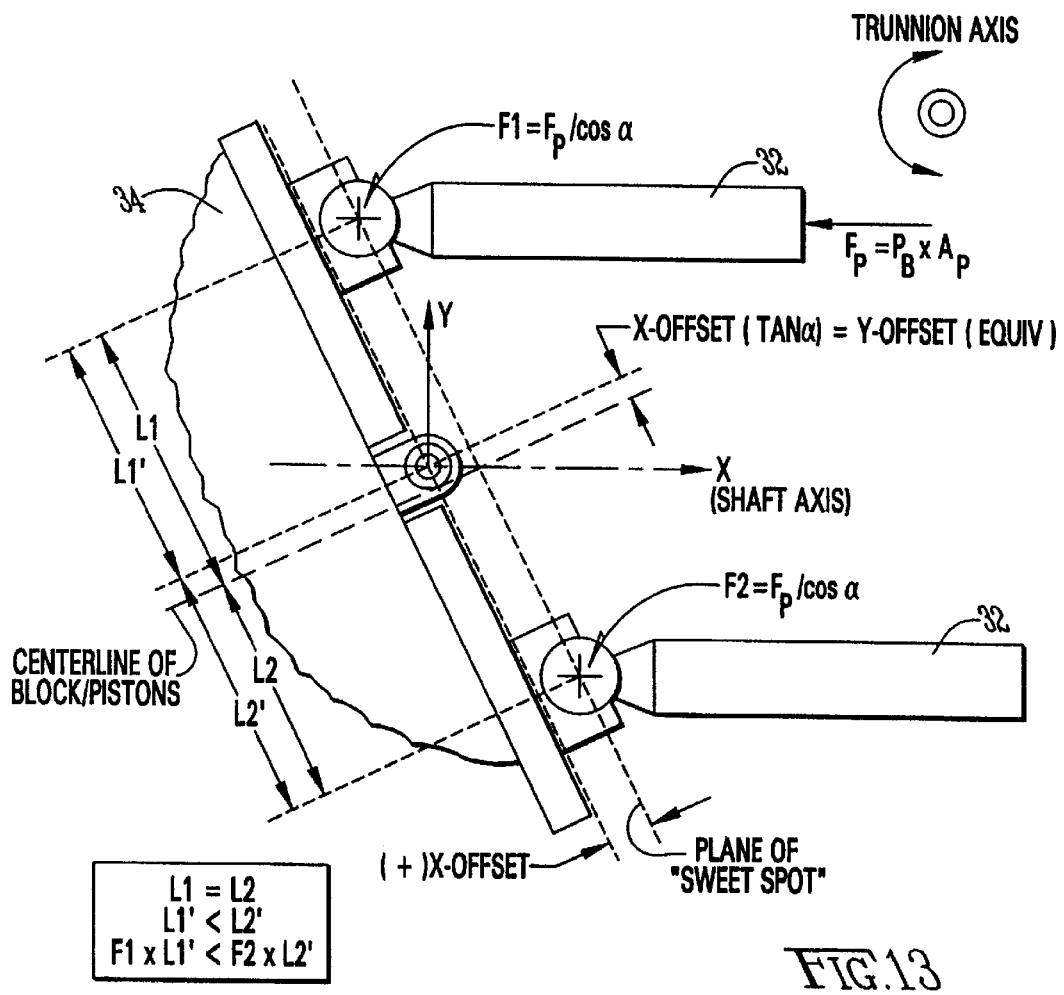
FIG. 13 is a diagram showing the input signal effect on the swashplate with the pivot point of the swashplate being offset with respect to the pivotal axes of the swashplate trunnion.

As shown in FIG. 13, the "X" offset is in a direction parallel to the axes of the pistons 32. The "Y" offset is in a direction perpendicular to the axes of the pistons.

Piston Bore Volume

Figure 14:
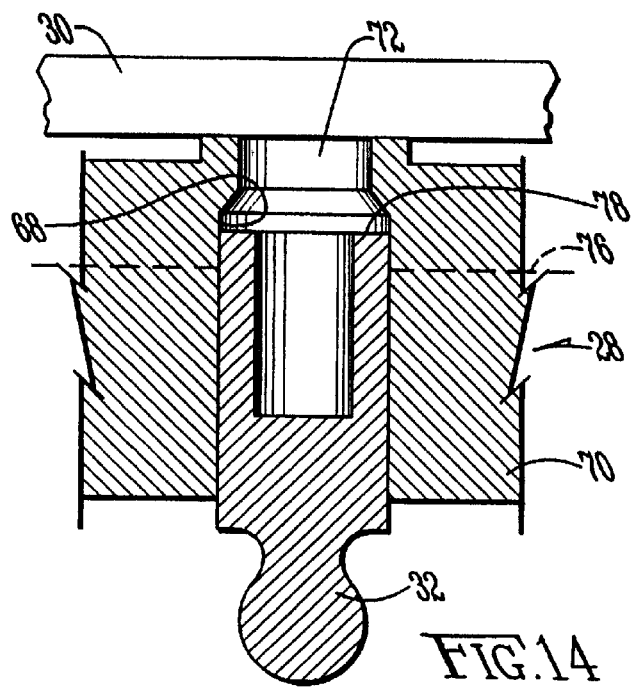
FIG. 14 is an enlarged scale cross section through a piston in a rotating group at its top dead center position.
Figure 15:
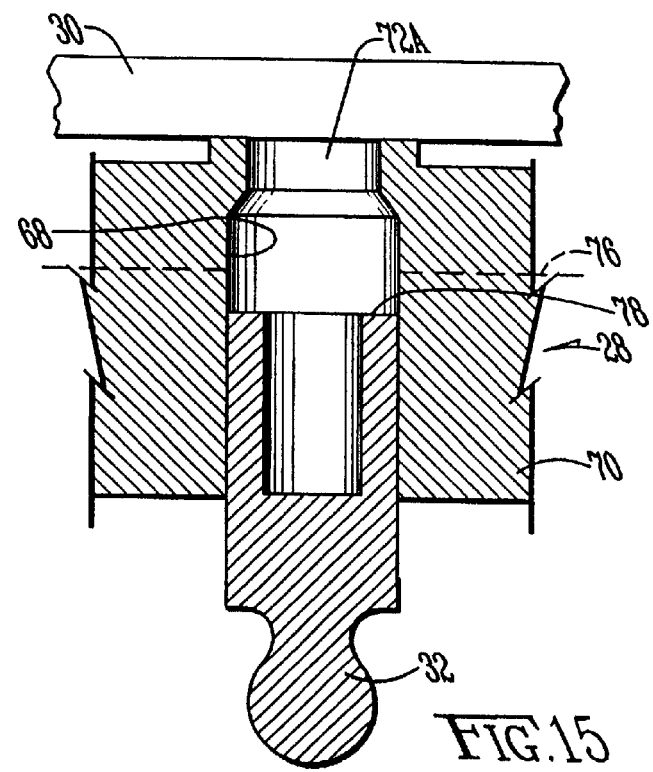
FIG. 15 is a view like FIG. 14 showing the piston in a bottom dead center position.
Figure 16:
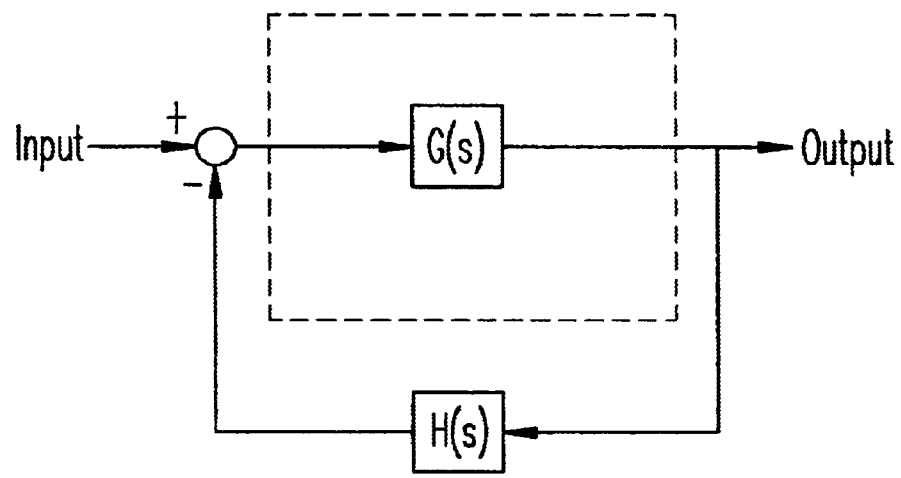
FIG. 16 is a control block diagram for a feedback (DFC) control system.
Figure 17:
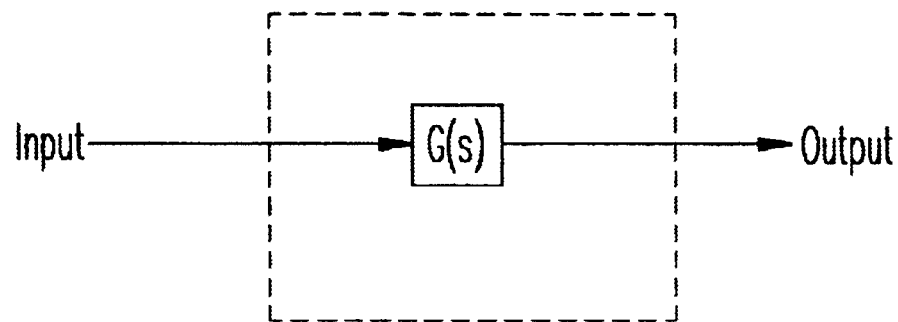
FIG. 17 is a control block diagram for a non-feedback (NFP) control system.

Piston/bore volume of the pumping device is the amount of oil in the piston bore which must be compressed or decompressed during the pumping cycle. Piston/bore volume of the cylinder block bore and piston affects the rise rate of piston bore pressure from the inlet port to the outlet port thus, affecting the separation of the control torques relative to speed, pressure, and angle. FIG. 14 shows a piston 32 in its TDC position showing a piston bore 68 in the block 70 of rotating group 28. When in the TDC position, the piston 32 creates a volume 72 in the bore 68. FIG. 15 shows the piston 32 in its BDC position creating a volume 72A in bore 68. As can be seen, the volume 72 of FIG. 14 is smaller than the volume 72A in FIG. 15. Thus, as indicated above, the ratio of piston bore volumes at TDC to BDC (i.e., volumes 72 to 72A) should be 0.53 to 0.73. Dotted line 76 shows the position of the end 78 of piston 32 when the piston (and swashplate) are in a neutral position denoting a "neutral" volume within the piston.

While each of the general concepts discussed above have been previously utilized in control systems, they have not been combined within the parameters outlined heretofore.

The foregoing concepts used according to these parameters do achieve the stated goals of the invention, and result in the dependency of the angular position of the swashplate being influenced less than 50% on operating conditions of the transmission, and is influenced by more than 50% by the input signal acting thereon to ensure the stability of the transitions operating range for speed, pressure and swashplate angle.

What is claimed is:

1. A method of allowing a hydraulic pump with non-feedback proportional control to closely approximate the control performance of a displacement feedback control, comprising, taking a hydraulic pump including a rotatable piston group engaging a pivotal swashplate, with the pump having associated therewith an input power shaft and a servo piston mechanically connected to the swashplate to influence a torque imposed on the swashplate when rotational power is imposed on the pump, and a neutral return spring connected to the swashplate and a pump housing, providing a valve plate to control fluid flow between pistons in the group and pressure and return fluid conduits, providing in the valve plate a plurality of elongated arcuate slots extending therethrough concentrically located at a constant radius with respect to a center of the plate and an axis of rotation of the piston group, with each slot having opposite ends, an elongated notch at one end of some of the slots and extending away from the end to form a bottom with side walls extending upwardly with respect to the bottom;

providing a valve plate index for the valve plate to approximately a –1.5° to –0.5° wherein the valve plate index is defined as the location of a pressure transition zone of a piston in the rotatable piston group being in either a fully retracted or fully extended position in its operational movement;

providing a cylinder block with a piston port for the piston group with fluid inlet and outlet ports in communication with the pistons of the piston group, providing valve plate crossport of approximately 3° to 9° wherein the valve plate crossport is defined as the amount of angle of rotation during which the piston port in the cylinder block is connected to both the inlet and outlet ports at the same time, maintaining the swashplate at a first swashplate offset of –0.015 in. to +0.015 in. in a first direction parallel to axes of rotation of the piston group;

maintaining the swashplate at a second swashplate offset of –0.060 in. to +0.060 in. in a second direction perpendicular to a longitudinal axis of the pistons maintaining the ratio of the volumes of the fluid in the piston bores at a top dead center position to the volume at a bottom dead center position of 0.53 to 0.73, and adjusting the spring rate of the return spring to a range of approximately 470–670 pounds/inch, whereby the dependency of the angular position of the swashplate is influenced by less than 50% on operating conditions of the transmission and is increasingly influenced by more than 50% by an input signal acting thereon to ensure stability throughout the transmission's operating range for speed, pressure and swashplate angle.

* * * * *